United States Patent
Li et al.

(10) Patent No.: US 9,304,814 B2
(45) Date of Patent: Apr. 5, 2016

(54) DETERMINE VARIABLE WAIT TIME IN AN ASYNCHRONOUS CALL-BACK SYSTEM BASED ON CALCULATED AVERAGE SUB-QUEUE WAIT TIME

(71) Applicant: International Business Machines Corporation, Armonk, NY (US)

(72) Inventors: Yong Li, Newton, MA (US); Hanson Lieu, Milton Keynes (GB); Ron Liu, San Jose, CA (US); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 13/873,569

(22) Filed: Apr. 30, 2013

(65) Prior Publication Data

US 2014/0325519 A1 Oct. 30, 2014

(51) Int. Cl.
*G06F 9/48* (2006.01)
(52) U.S. Cl.
CPC ........ *G06F 9/4881* (2013.01); *G06F 2209/483* (2013.01); *G06F 2209/5013* (2013.01); *G06F 2209/548* (2013.01)
(58) Field of Classification Search
None
See application file for complete search history.

(56) References Cited

U.S. PATENT DOCUMENTS

| | | | |
|---|---|---|---|
| 6,438,135 B1 * | 8/2002 | Tzeng | 370/412 |
| 7,322,034 B2 | 1/2008 | Crawford, Jr. et al. | |
| 8,108,916 B2 | 1/2012 | Fink et al. | |
| 8,185,928 B2 * | 5/2012 | Smith | H04N 21/4331 370/448 |
| 2002/0114442 A1 | 8/2002 | Lieberman et al. | |
| 2003/0101213 A1 * | 5/2003 | Wright | 709/203 |
| 2008/0201383 A1 * | 8/2008 | Honigfort | 707/200 |
| 2011/0231457 A1 | 9/2011 | Tager et al. | |
| 2012/0260261 A1 | 10/2012 | Tillier | |
| 2014/0189083 A1 * | 7/2014 | Ho et al. | 709/223 |

FOREIGN PATENT DOCUMENTS

| | | |
|---|---|---|
| EP | 1258132 A2 | 11/2002 |
| EP | 1061722 B1 | 8/2003 |

OTHER PUBLICATIONS

Yoshihara et al., "Dynamic Polling Scheme Based on Time Variation of Network Management Information Values", Proceedings of the Sixth IFIP/IEEE International Symposium on Integrated Network Management, 1999. Distributed Management for the Networked Millennium. May 24-28, 1999, pp. 141-154. DOI: 10.1109/INM. 1999.770680.
Title: "Light Weight Workload Management Server Integration", U.S. Appl. No. 13/538,854, filed Jun. 29, 2012, Authors: Caufield et al.

* cited by examiner

*Primary Examiner* — Mengyao Zhe
*Assistant Examiner* — Michael Ayers
(74) *Attorney, Agent, or Firm* — Penny L. Lowry; Susan Murray

(57) ABSTRACT

A method includes a workload management (WLM) server that receives a first CHECK WORKLOAD command for a workload in a queue of the WLM server. It may be determined whether the workload is ready to run on a WLM client. If the workload is not ready to run, a wait time for the workload with the WLM server is dynamically estimated. The wait time is sent to the WLM client. If the workload is ready to run, then a response is sent to the WLM client that workload is ready to run.

12 Claims, 8 Drawing Sheets

DETERMINE VARIABLE WAIT TIME IN AN ASYNCHRONOUS CALL-BACK SYSTEM BASED ON CALCULATED AVERAGE SUB-QUEUE WAIT TIME

FIELD

The present invention relates generally to data integration, and more particularly, relates to an asynchronous call-back system.

BACKGROUND

Data integration may be described as extracting data from a source, transforming the data, and loading the data to a target. That is, data integration is Extract, Transform, Load (ETL) processing. Data integration processing engines may be scalable and capable of processing large volumes of data in complex data integration projects. It is common for multiple users (e.g., customers) and projects to share a single data integration processing engine that is responsible for handling all of the data integration processing for those multiple users. This high volume, highly concurrent processing may be resource intensive, and users try to balance the availability of system resources with the need to process large volumes of data efficiently and concurrently.

Workload management capabilities may be available at Operating System (OS) or lower levels. Workload management operates at a level that is removed from the data integration environment.

Some users use a multi-node grid so that they can utilize a grid resource manager to better control system resources. The grid resource manager deploys data integration projects on a grid.

Some users use Symmetric Multiprocessing (SMP), which are multi-core, hyperthreaded systems for data integration.

Some users rely on workload schedulers to control workloads. This requires coordination between different groups or the same group running different projects.

SUMMARY

An embodiment is directed to a method of an asynchronous call-back system and a computer program product of the same. The method includes a workload management (WLM) server that receives a first CHECK WORKLOAD command for a workload in a queue of the WLM server. It may be determined whether the workload is ready to run on a WLM client. If the workload is not ready to run, a wait time for the workload with the WLM server is dynamically estimated. The wait time is sent to the WLM client. If the workload is ready to run, then a response is sent to the WLM client that the workload is ready to run.

In another embodiment, a method of asynchronous call-back is described. The method includes sending a first CHECK WORKLOAD command from a workload management (WLM) client to a WLM server for a workload in a queue. A run status of the workload is received from the WLM server. If the workload is not ready to run based on the run status, a wait time for the workload that is dynamically estimated by the WLM server is requested. The wait time from the WLM server is received. A second CHECK WORKLOAD command from the WLM client to the WLM server after the wait time has expired is sent. If the workload is ready to run, then the workload is run on the WLM client.

BRIEF DESCRIPTION OF THE DRAWINGS

Embodiments are illustrated by way of example, and not by way of limitation, in the figures of the accompanying drawings in which reference numerals refer to similar elements.

DETAILED DESCRIPTION

Figure 1:
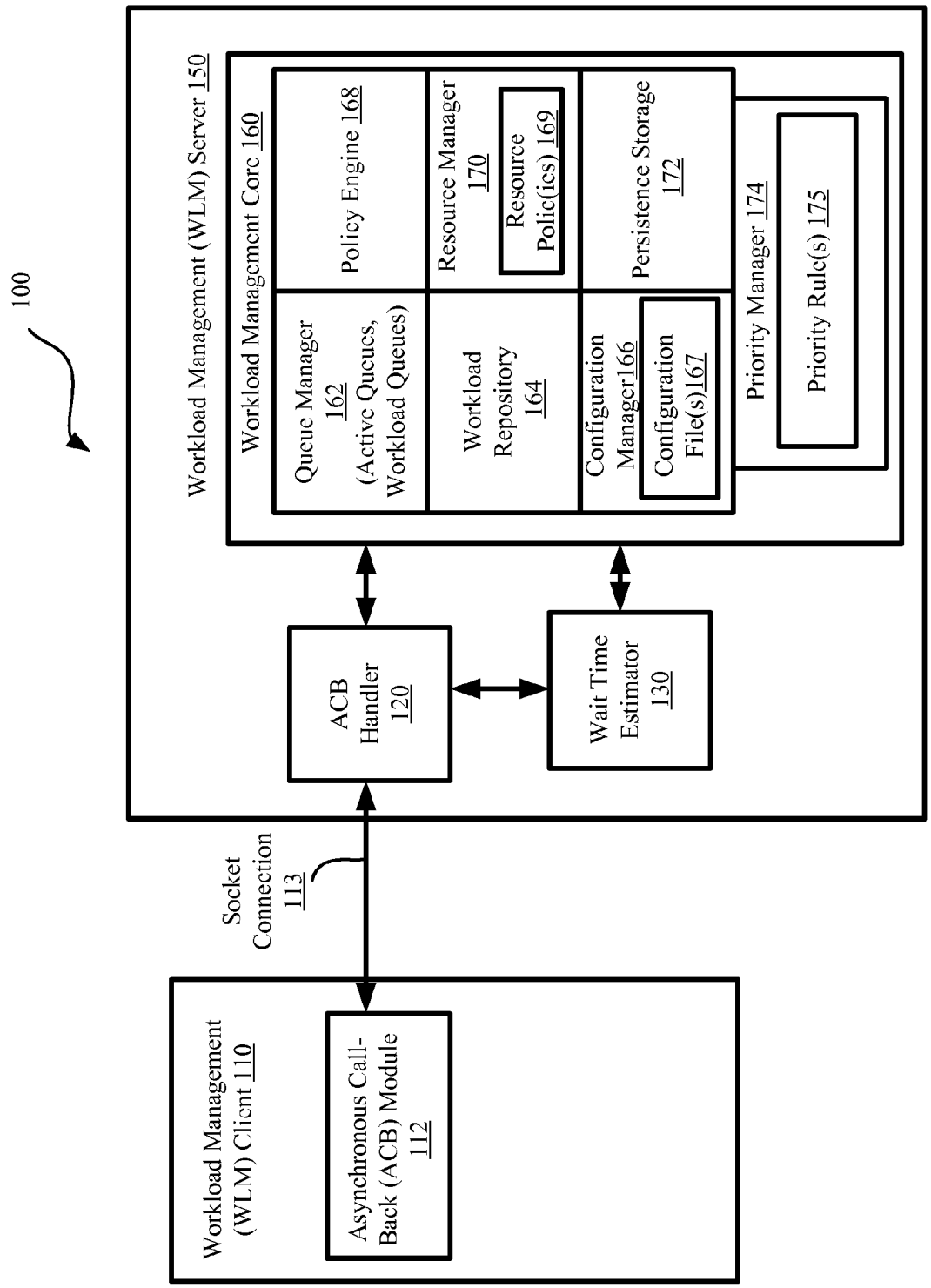
FIG. 1 is a block diagram of an asynchronous call-back system, according to an embodiment.

The descriptions of the various embodiments disclosed have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A parallel execution environment for data integration applications may require workload management at the user level. One way to support workload management at the user level is to support an asynchronous call-back mechanism for a user to control when and how to start a workload. In one embodiment, a software application may be a user. Each workload may have its own representation in the operating system, i.e., a process or a thread in a process. A workload execution process from a workload management (WLM) client may check with a workload management (WLM) server to determine whether there are sufficient system resources for the workload to run under the supervision of the WLM client. If there are sufficient system resources, then the workload may execute outside of the WLM server under the supervision of the WLM client. If not enough system resources are available per the WLM server, then the workload may stay in a pre-selected queue and the workload execution process may check with the WLM server periodically to determine whether the system resources are available. Based on the availability of the system resources and other factors (i.e., predefined priority rules to manage the priority of workloads or logical computing resources), the WLM server may decide whether a requesting workload can run. This checking process is iterative until the workload eventually gets the chance to run.

However, problems may arise with the asynchronous call-back system if there are too many workloads placed in one or more queues. A cumulative side effect of checking workload status may significantly impact the system throughput. As the number of queued workloads increase, the number of CHECK WORKLOAD commands increases, which increases context switch rates. A context switch is the process of storing and restoring the state of a process or thread so that it may resume execution from the same point at a later time. This is to enable multiple processes or threads to share a single CPU. When a CHECK WORKLOAD command calls the WLM server to get status, the WLM server invokes a thread to service the request. The more threads due to more checks, results in more switching of the threads of the CPU in and out of the registers, hence causing more context switching. The high context switching rate may cost many valuable CPU cycles, and may cause significant performance degradation. Embodiments herein provide for a method, apparatus, and computer program product to dynamically estimate wait time between two call-backs to a WLM server when determining whether a workload is ready to run or not on a WLM client.

FIG. 1 illustrates an asynchronous call-back system 100, in accordance with certain embodiments of the present invention. In FIG. 1, a workload management (WLM) client 110 may interact with a WLM server 150. The WLM client 110 may process data integration workloads (i.e., extract, transform, load (ETL) workloads), and the workload management server 150 may allow management of these data integration workloads using ETL metrics. In certain embodiments, a workload may be referred to as a job.

Still referring to FIG. 1, the WLM client 110 may include an asynchronous call-back (ACB) Module 112. The WLM server 150 may include an ACB handler 120, a wait time estimator 130, and a WLM core 160.

In FIG. 1, the WLM client 110 may be coupled to the WLM server 150 through a socket connection 113. A socket may be software that opens a network connection to allow data to be read and written over a network. The socket connection 113 may couple the WLM client 110 and the WLM server 150 between the ACB module 112 and the ACB handler 120, respectively. The ACB handler 120 may be in communication with the WLM core 160 and the wait time estimator 130. The wait time estimator 130 may also be in communication with the WLM core 160.

In FIG. 1, the WLM core 160 may include the following components: a queue manager 162 that manages, for example, active queues and workload queues; a workload repository 164 for storing workload information; a configuration manager 166; a policy engine 168; a resource manager 170; persistence storage 172 for storing a file, a database, etc.; and a priority manager 174.

In FIG. 1, the configuration manager 166 may manage one or more configuration files 167. A configuration file 167 may be described as a file (e.g., an Extensible Markup Language (XML), HTML, or XHTML file) containing class description, resource policies, priority rules, and system parameter settings. The policy engine 168 may manage the resource manager 170, which may manage one or more resources policies 169. A resource policy 169 may be described as a policy for how physical and logical resources are to be used. The priority manager 174 may manage one or more priority rules 175. A priority rule 175 may be described as providing a technique for assigning a priority to a workload and is further described in FIG. 2.

In FIG. 1, in certain embodiments, the WLM core 160 may enable creation and management of workloads via an asynchronous queuing mechanism. The WLM core 160 may use two-level abstraction to represent both logical and physical resources. The WLM core 160 may grant users executing under the supervision of the WLM client 110 control over workload priority and scheduling. Also, the WLM core 160 may determine workload execution order based on three factors: at least one user-specified run schedule, at least one resource policy, and at least one priority rule (i.e., either system provided or user-specified). In one embodiment, a user-specified run schedule may be an overriding factor that controls workload execution order. In another embodiment, a user-specified run schedule may be a factor given weight in determining workload execution order, but not one which singly controls workload execution order.

In certain embodiments of FIG. 1, in order to determine whether a workload is ready to begin execution, the user may issue a SUBMIT WORKLOAD command followed by a CHECK WORKLOAD command. The SUBMIT WORKLOAD command may be executed asynchronously according to a run schedule specified by the user. The user may issue a CHECK WORKLOAD command to determine whether a workload is ready to begin execution. Once the workload is runnable, the user may receive an indication that the workload is runnable and may then start the workload execution under the supervision of the WLM client 110.

In certain embodiments of FIG. 1, the resource policy 169 may be a workload count policy that imposes a limit on the total number of workloads that can run concurrently. The user may specify a value that applies to the entire system and also specify a value that applies to each queue by modifying the resource policy 169. For example, one resource policy 169 says system-level workload count is 60, and the workload count for each queue is 20. In certain embodiments, the specified workload count for a queue can exceed that of the system, but the system value determines the final workload count.

In certain embodiments of FIG. 1, the WLM core 160 may be coupled to an application and is able to create "logical resources". This means that the WLM core 160 may use metrics available to a WLM client 110 to coordinate workload execution. For example, the WLM core 160 may limit the number of workloads started in a given time frame. In another example, the WLM core 160 may give different types of workloads precedence over other types of workloads (i.e., a data quality workload has higher priority than a data integration workload). In yet other examples, the WLM core 160 may give workloads owned by a particular project (e.g., data integration projects) higher priority. That is, a logical resource may be described as representing an ETL metric.

In certain embodiments of FIG. 1, the WLM core 160 may manage and optimize workload execution based on system capacity, system resource usage level, and a configuration file. The WLM core 160 is transparent to information integration developers and an administrator may adjust configuration defined in the configuration file on an as needed basis. The configuration of workloads may be adjusted dynamically with the existing workloads present in the WLM core 160. With the WLM core 160, new configuration information may be applied automatically, without WLM server 150 requiring shutdown and restart.

In certain embodiments of FIG. 1, the WLM core 160 supports logical resources in addition to physical resources to better meet data integration requirements. Physical resources may include, but are not limited to, Central Processing Unit (CPU) or processor, memory, disk space, and swap space. In addition to physical resources, the WLM core 160 may allow the user to define logical resources and how to share those logical resources among workloads through resource policies. Logical resources may be, for example, a partitioned processor or memory. In certain embodiments, a resource policy may be defined as one of many different types including, but not limited to:

- number of concurrent workloads
- number of workloads that can be started within a given time frame
- workload type associated with specific data integration functionality, such as, for example, data quality, data profiling, data transformation, business glossary, metadata management, database connectivity, real-time services, data analysis and reporting, etc.
- workload type categorized by physical resources utilization, such as, for example, low/medium/high CPU/memory/disk consumption
- workload type specific to a user role, such as, for example, normal or admin user
- workload type specific to parallelism, such as, for example, parallel workload, sequential workload, sequence workload
- number of partitions, such as, for example, 2-node, 4-node, 8-node, etc.
- workloads within a specific project
- resource allocation of logical and physical resources (e.g., a percentage, such as 30%, 60%, etc., of a logical or physical resource that a queue may get)

Figure 3A:
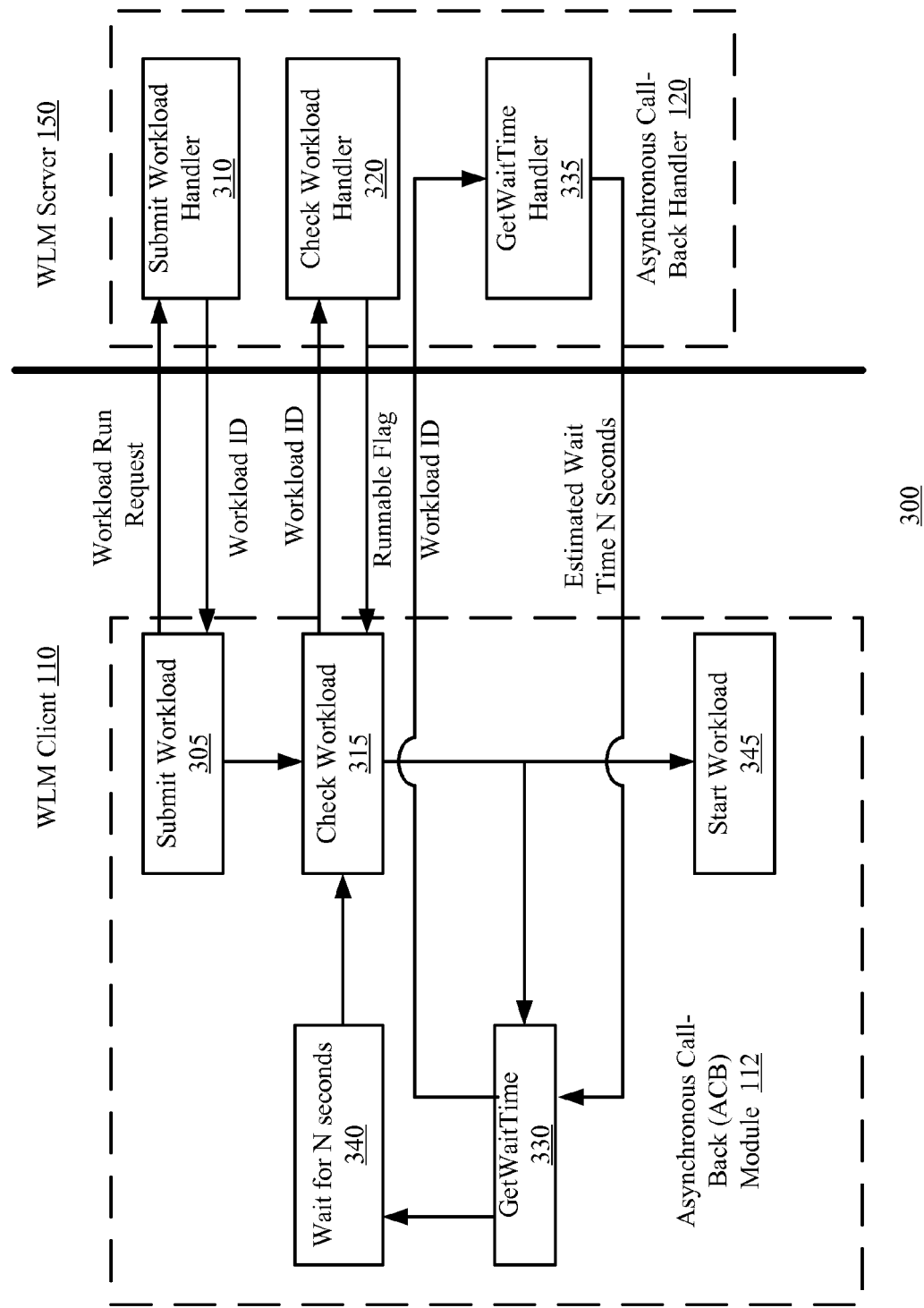
FIG. 3A is a parallel execution engine of the asynchronous call-back mechanism, according to an embodiment.
Figure 3B:
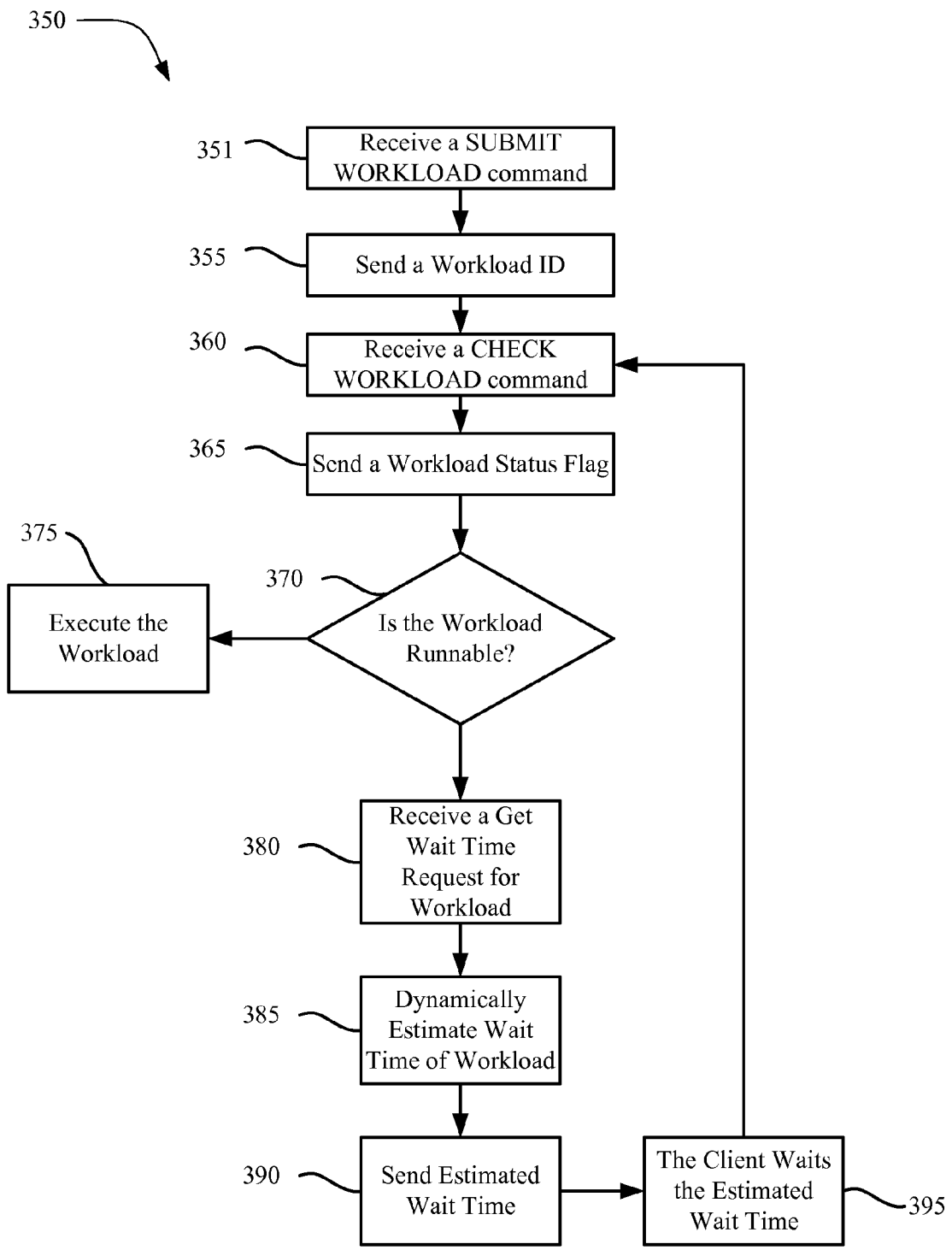
FIG. 3B is a method of asynchronous call-back of the asynchronous call-back mechanism of FIG. 3A, according to an embodiment.

In certain embodiments of FIG. 1, the WLM client 110 and WLM server 150 may provide an asynchronous call-back mechanism, discussed further in FIG. 3A and FIG. 3B. Within the WLM server 150, a workload may start once the workload has been determined as the next runnable workload. However, with the WLM server 150, the user has control over the transition phase between queued and running. In particular embodiments, if the user needs to perform additional tasks right before workload is run, then a time window is available to do so. For example, if disk space is full and a workload may fail due to lack of disk space, the user is able to clean up disk before the workload starts. In another example, a workload may not be runnable, so the user may reset the workload (i.e., clean up failure state). The asynchronous call-back mechanism may provide flexibility for the user to start the workload when the workload is ready. The asynchronous commands (e.g., SUBMIT WORKLOAD, CHECK WORKLOAD, START WORKLOAD) may be made by the user to indicate that a transition phase (e.g., queued→running, running→completed) is ready to occur from a user perspective.

Embodiments allow the user to control when to actually start a workload after the resources requested have been allocated, how to utilize those resources, and when to release those resources.

With embodiments, physical and logical resources are used to distribute system resources among different groups to help avoid bottlenecks and prevent the system from being overloaded. Logical and physical resources are represented using one resource policy in a two-level hierarchical structure, making it possible to correlate high level logical resources to low-level physical resources. This approach allows the user to directly work with high-level, easy-to-understand logical resources, while the underlying physical resources are handled automatically by the WLM core 160.

Embodiments may be implemented at a data integration application level in a Symmetric Multiprocessing (SMP) data-integration environment. Workload submission and run is controlled by the user through the WLM client 110, and the workload management core 160 detects whether or not there are enough resources for a given workload. The workload management core 160 then gives the control back to the user to actually start the workload. Because the user has control over when to run a workload, workload scheduling is integrated into the workload management server 150. The workload execution factors include: user-specified run schedules, user-specified priority rules, and available resources.

Figure 2:
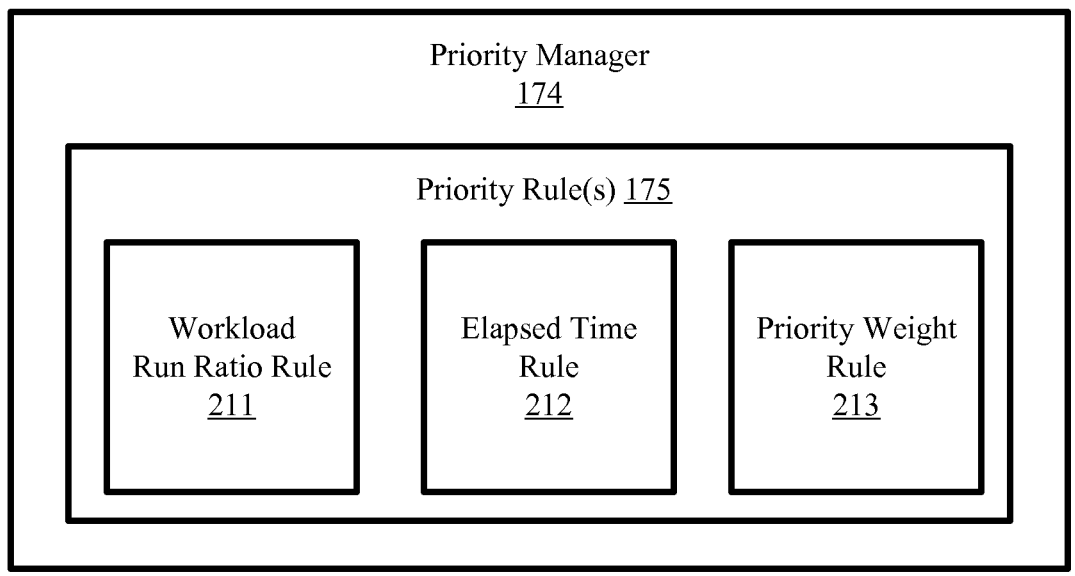
FIG. 2 is a more detailed block diagram of a priority manager of FIG. 1, according to an embodiment.

Referring to FIG. 2, in certain embodiments, the priority rules 175 provided in the priority manager 174 include, but are not limited to: workload run ratio rule 211, an elapsed time rule 212, and a priority weight rule 213. Also, users may specify other priority rules to be used to determine the priority of a workload. In certain embodiments, one or more of the rules may not exist.

In FIG. 2, the workload run ratio rule 211 defines the order and the proportionate number of workloads that may be run across all queues. The following are examples:
- five workloads from high priority queues, 2 workloads from medium priority queues, and one workload from low priority queues
- one high CPU usage workload, two medium CPU usage workloads, three low CPU usage workloads, ten very low CPU usage workloads
- one workload from each project
- one workload running on 4 partitions, two workloads running on 2 partitions, four workloads running on 1 partition
- three development workloads, five testing workloads, twenty production workloads In FIG. 2, the elapsed time rule 212 treats all workloads as having the same priority and ensures first-in first-out fairness. The priority index based on the elapsed time rule may be: the workload queued time. The longer the workload is in the queue the higher its priority index.

In FIG. 2, the priority weight rule 213 may assign a coefficient to a specific attribute (described below) and use the coefficient, as a weight, to calculate a priority index. In certain embodiments, the following attributes may be used to determine a priority weight (with example priority weights shown in parenthesis):
- High priority workload (50), medium priority workload (20), low priority workload (10)
- Parallel workload (30), sequential workload (5), sequence workload (20)
- CPU intensive workload (40), Input/Output (I/O) intensive workload (30), database workload (20)
- Workload running on 4 partitions (20), workload running on 2 partitions (10), workload running on 1 partition (5)
- Development project (10), testing (50), production (100)

In certain embodiments illustrated in FIG. 2, a priority index may be calculated using a hybrid formula given below that includes the elapsed time rule 212 and the priority weight rule 213 similar to those mentioned above:

$$\text{Priority Index} = \text{PriorityWeight} * 20 + \text{WorkloadQueuedTime}$$

For example, assume that the user wants to assign high, medium, or low priority to three queues, respectively. The user then selects the priority weight rule 213, and this rule ensures workloads in the high priority queue get higher priority to run next. The user may also include the elapsed wait time rule 212 to determine the workloads priority. The WLM core 160 determines the priority index of a queued workload based on the priority of that workload and the amount of time the workload waits in queue. The "20", in the formula above, may be an exemplary additional coefficient that may be adjusted based on whether the user wants the priority index to be based off more of the priority weight or the workload queued time Then, the WLM core 160 picks up the workload with the highest priority index to run next.

Referring now to FIG. 3A, an asynchronous call-back mechanism 300 is illustrated, according to an embodiment.

The FIG. 3A illustrates various communications between the components of the asynchronous call-back mechanism 300. The asynchronous call-back mechanism 300 may include the ACB module 112 of the WLM client 110 and the ACB handler 120 of the WLM Manager 150. A method of the asynchronous call-back mechanism 300 is discussed below in FIG. 3B. A submit workload module 305 may issue a workload run request (SUBMIT WORKLOAD command) by the user to the submit workload handler 310. The submit workload handler 310 may return to the submit workload module 305 a workload ID. A check workload module 315 may issue a CHECK WORKLOAD command including the workload ID to a check workload handler 320. The check workload handler 320 may return to the check workload module 315 or the ACB Module 112 a runnable flag, which may include information on whether the workload is ready to start. If the workload is runnable, the start workload module 345 may signal the WLM client 110 to execute the workload with a START WORKLOAD command.

Still referring to FIG. 3A, if the workload is not runnable a get wait time (GWT) module 330 of the WLM Client 110 may request an estimated wait time from a GWT handler 335 of WLM server 150 for when the check workload module 315 may call-back (issue a second CHECK WORKLOAD command) to determine the status of the workload. The GWT handler 335 may obtain the wait time before the check workload module 315 may call-back. The GWT handler 335 may return to the GWT module 330 the estimated wait time. The GWT module 330 may tell a timer 340 how long to wait before signaling the check workload module 315 to issue a second CHECK WORKLOAD command to the workload handler 320 to check the status of a workload. The estimated wait time may vary depending on several characteristics of the workload described in more detail herein. After the wait time expires, then the check workload module 315 may check the status of a workload to determine whether it is ready to run on the WLM client 110 or not with a CHECK WORKLOAD command.

Referring now to FIG. 3B, an exemplary asynchronous call-back method 350 performed by the components of FIG. 3A is illustrated, according to an embodiment. In operation 351 the WLM server 150 may receive a SUBMIT WORKLOAD command from the WLM client 110. In operation 355, the WLM server may send back to the WLM client 110 a workload ID. In operation 360, the WLM server 150 may receive a CHECK WORKLOAD command from the WLM client 110. In operation 365, the WLM server 150 may send a workload status flag to the WLM client 110 which indicates whether the workload is runnable. In operation 370, if the workload is runnable, then in operation 375, the workload may be executed with a START WORKLOAD command. If the workload is not runnable, then in operation 380 the WLM server 150 may receive a get wait time request for the workload from the WLM client 110. In operation 385, the WLM client may estimate the wait time of the workload. The steps of operation 385 are further described in FIG. 5-FIG. 7. In operation 390, the WLM server 150 may send the estimated wait time to the WLM client 110. In operation 395, the WLM client may wait the estimated wait time. After waiting the estimated wait time, the method 350 may return to operation 360 where the WLM server 150 may receive a CHECK WORKLOAD command from the WLM client 110.

Figure 4:
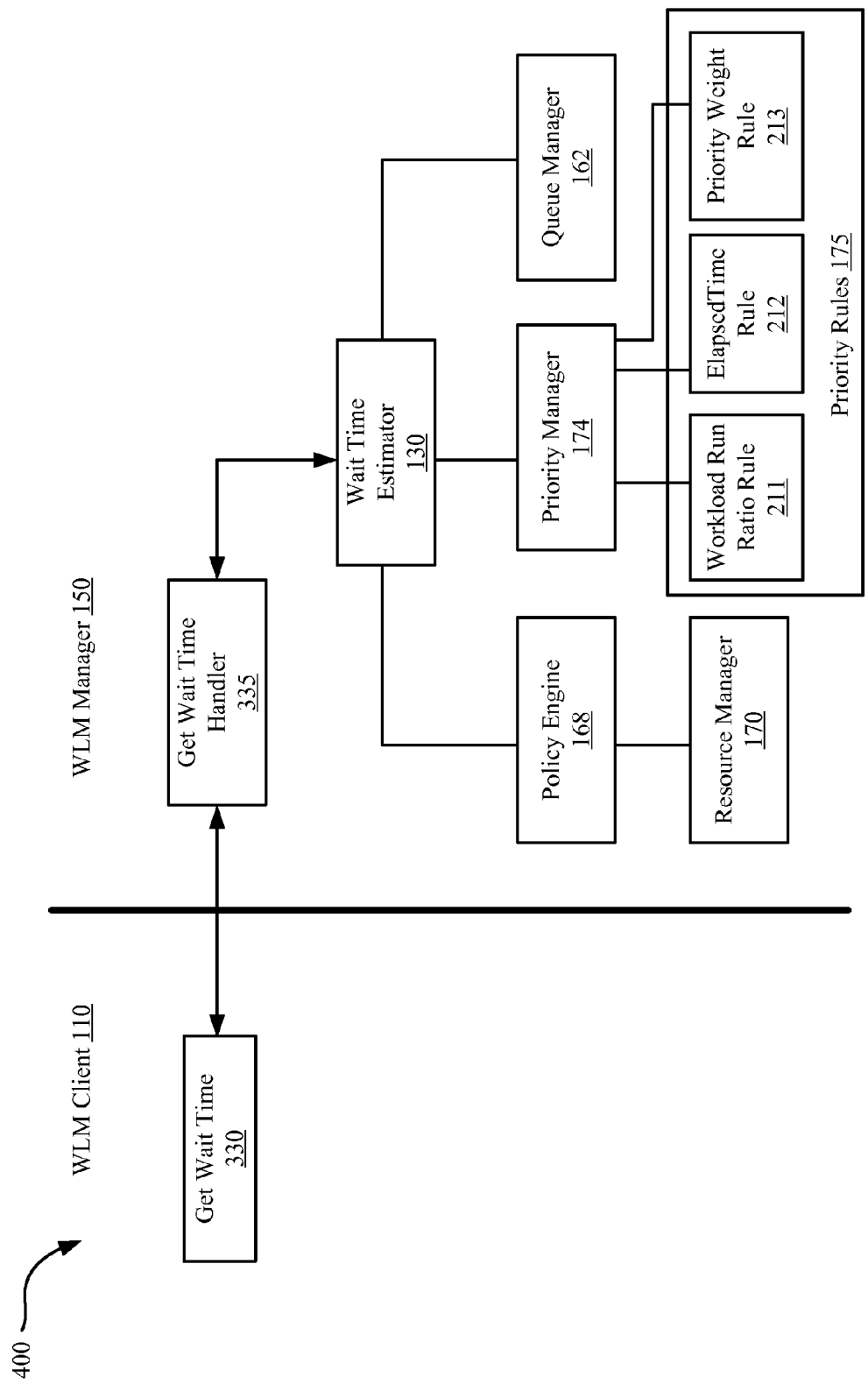
FIG. 4 is an architectural block diagram for obtaining a variable wait time, according to an embodiment.

Referring now to FIG. 4, a get wait time (GWT) architectural diagram 400 is illustrated, according to an embodiment. The GWT module 330 of the WLM client 110 may send a GWT request to the GWT handler 335 of the WLM server 150. The GWT handler 335 may invoke the wait time estimator 130. The wait time estimator 130 may be responsible for estimating wait time by communicating with other components. The wait time estimator 130 may couple with the policy engine 168 for checking resource constraints with the resource manager 170 and resource policies 169. The wait time estimator 130 may also couple with the priority manager 174 for finding out the priority rules 175, which may include the workload run ratio rule 211, elapsed time rule 212, and the priority weight rule 213. The wait time estimator 130 may also be coupled with the queue manager 162 for determining the dynamic changes of each queue including calculating the average queued time of each queue.

Figure 5:
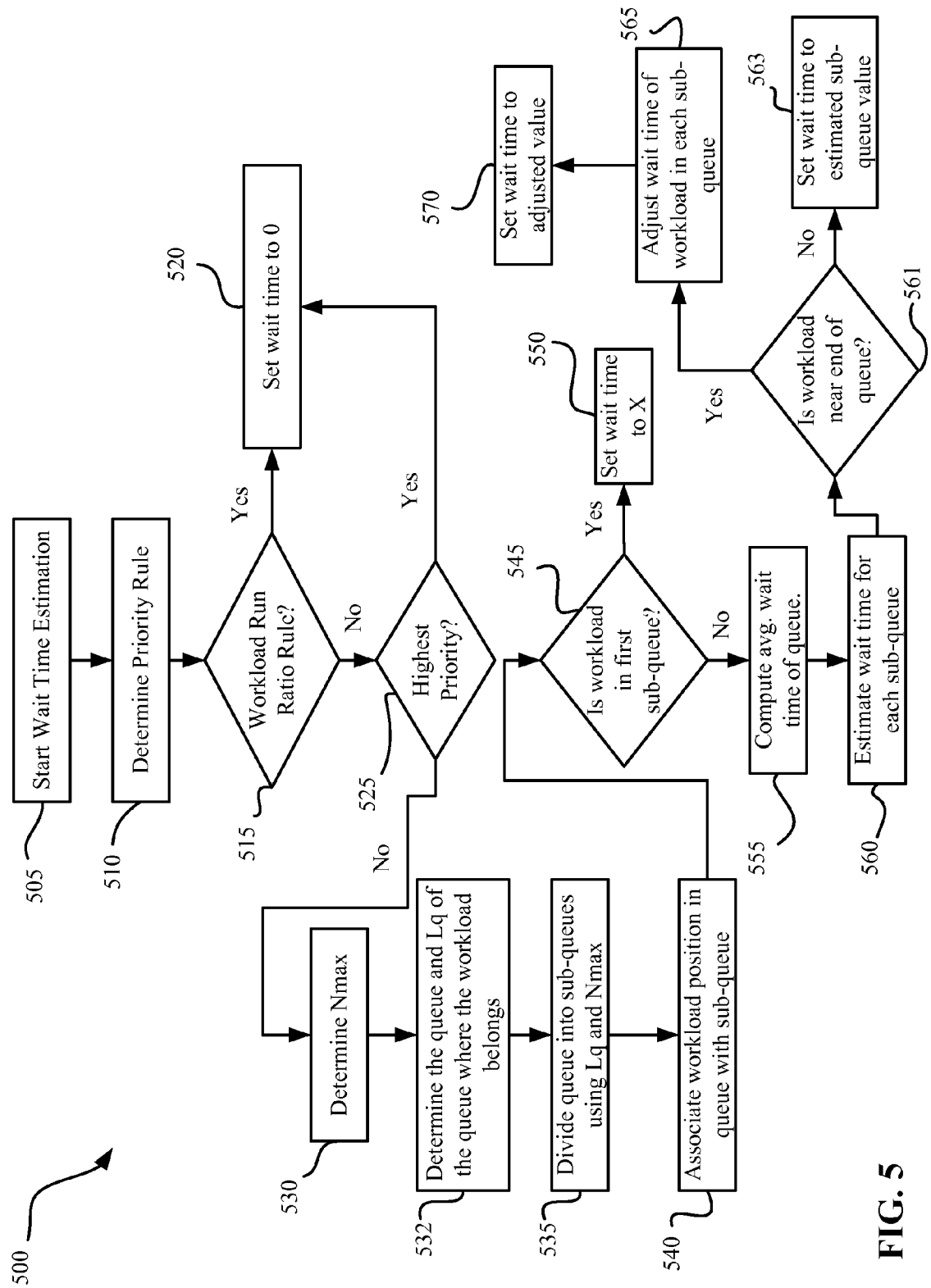
FIG. 5 is a method for determining the variable wait time, according to an embodiment.

Referring now to FIG. 5, a method 500 of wait time estimation of the asynchronous call-back method 350 (FIG. 3B) in operation 385 is illustrated, according to an embodiment. The method 500 may be the logic used by the wait time estimator 130 in obtaining the estimated wait time for a workload call-back. In operation 505, the wait time estimation may begin when the GWT handler 335 invokes the wait time estimator 130 to determine an estimated wait time for a workload. In operation 510, the wait time estimator 130 may determine which priority rule 175 is used for the workload. In operation 515, if the workload has a workload run ratio rule 211 as the priority rule 175, then, in operation 520, a first wait time may be returned to the GWT handler 335 and returned to the ACB module 112. An example first wait time for a workload with a workload run ratio rule 211 is 0 seconds. In an embodiment, the estimated wait time by the wait time estimator 130 may be time in addition to a default wait time hard coded into the ACB module before a call-back occurs. For example, the wait time estimator may return a wait time of 0 seconds for a particular workload while the ACB module 112 has a default wait time of 2 seconds. The time before the ACB performs a call-back will therefore be 0 second+2 seconds=2 seconds.

Still referring to FIG. 5, if the workload run ratio rule does not apply in operation 515, then, in operation 525, the wait time estimator 130 may determine whether the workload has the highest priority. Both the priority weight rule 213 and the elapsed time rule 212 may consider priority. If the workload has the highest priority, then, in operation 520, the workload may not need to wait and the wait time estimator 130 may return a second wait time. The second wait time may be 0 seconds, for example since the workload has the highest priority and is likely to be ready to run the next time the WLM client 110 checks the status of the workload The wait time estimator 130 may then estimate the wait time for the next workload.

Figure 6:
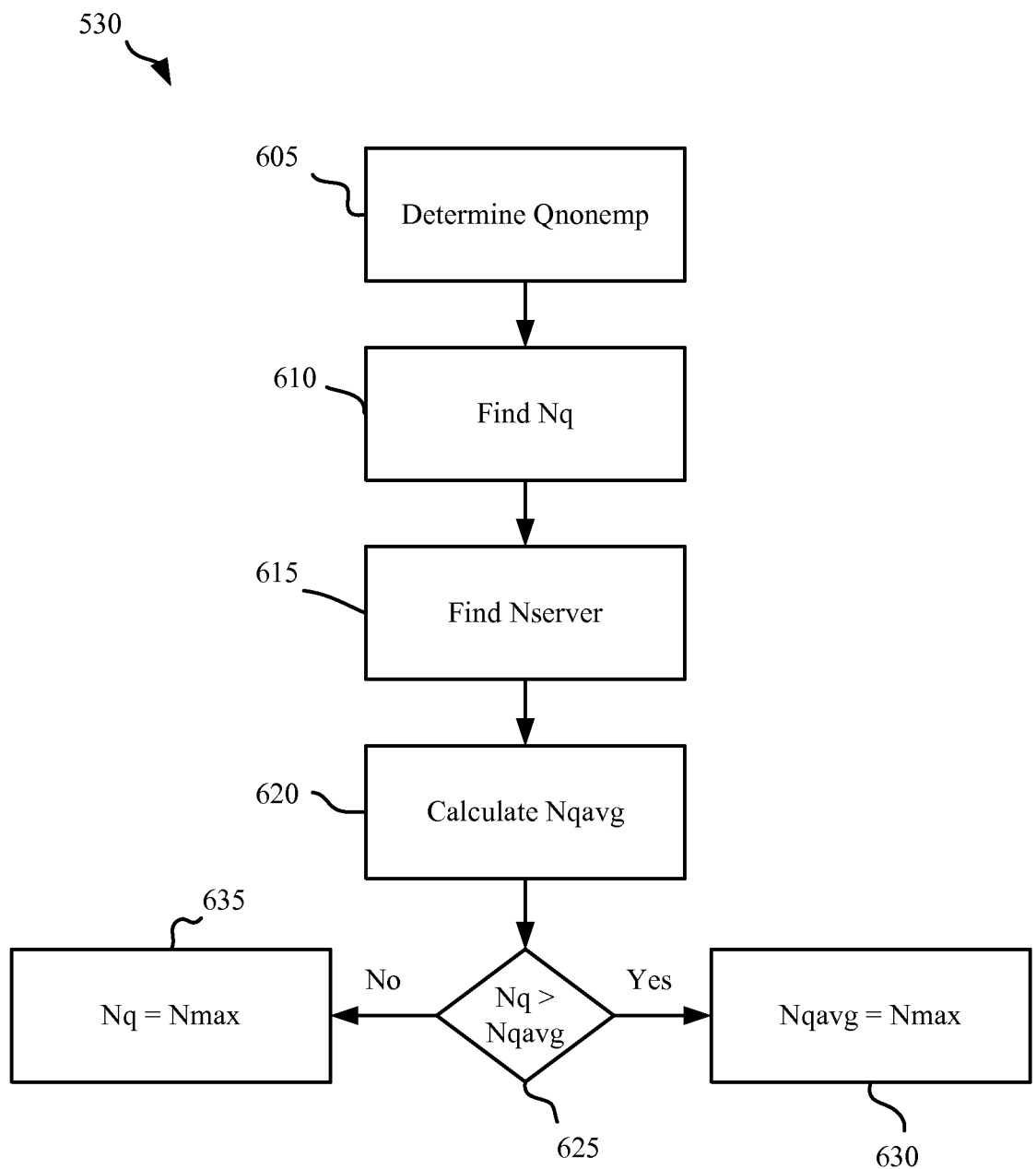
FIG. 6 is one of the operations of the method of FIG. 5 in greater detail, according to an embodiment.

Still referring to FIG. 5 at operation 525, if the workload does not have the highest priority, the method 500 may go to operation 530. In operation 530, the wait time estimator 130 may determine the weighted maximum workload count per queue (Nmax). Generally, the workload count may be the number of workloads that may concurrently start at a system level or a queue level. In FIG. 6, operation 530 for determining Nmax is illustrated in more detail.

Still referring to FIG. 5, in operation 532, the wait time estimator 130 may determine which queue the given workload belongs. The wait time estimator 130 may also determine how many pending workloads are in that queue, which may be referred to as the queue length (Lq). In operation 535, the wait time estimator 130 may divide the queue into sub-queues. The number of sub-queues (Ns) may be determined using Lq and Nmax in the formula $Ns=Lq/Nmax$. In operation 540, a workload position may be determined to belong to a sub-queue. Operation 540 is illustrated in more detail in FIG. 7. A sub-queue is a portion of the queue that may contain one or more workloads. For example, if a queue could hold 60 workloads and the number of sub-queues is calculated to be 3, then each sub-queue may hold up to 20 workloads each. The sub-queue may also define a location in the queue. For instance, the first 20 workloads in a queue may belong to the first sub-queue, while the next 20 may belong to the second sub-queue.

Still referring to FIG. 5, in operation 545, it may be determined whether the workload is in a first sub-queue. If the workload is in the first sub-queue, then, in operation 550, the wait time estimator 130 may set the wait time to a third wait time. The third wait time may be a fixed wait time X where X is a hard coded wait time for the workloads in the first sub-queue. If the workload is not in the first sub-queue, then the wait time estimator 130 may determine the average wait time or a fourth wait time of the queue in operation 555. The wait time average of the queue (Wqavg) may be determined by adding the actual queued times of each workload, and dividing the sum by the length of the queue (Lq). In operation 560, the average wait time of each sub-queue (Wsavg) is estimated depending on the position of the sub-queue in the queue with the equation Wsavg=Wqavg/(Ns−Sindex). The variable Sindex is the index of a sub-queue (e.g. sub-queue 0, 1, 2, 3 . . . ). In operation 561, the wait time estimator 130 may determine whether the workload is near the end of the queue. If the workload is not near the end of the queue, then, in operation 563, the wait time may be set to the estimated wait time of the sub-queue. If the workload is in a sub-queue that is not the first sub-queue, then method 500 may go to operation 565.

Still referring to FIG. 5, in operation 565 the wait time of the workload in each sub-queue may be adjusted. In operation 565, the wait time may be adjusted for workloads at the end of the queue. This adjustment is to account for situations where the queue has grown to its maximum size (Lqmax) then started to reduce in size because no new workloads were added and more pending workloads became runnable. Without any adjustment, Wqavg over estimates wait time because the wait time should get smaller after the queue starts emptying workloads. The wait time for a particular workload may now be more related to how fast the workloads before this one can run. The refined formula for estimated wait time of a workload (Ww) may be: Ww=Wsavg*Lq/Lqmax. In operation 570, the wait time may be set to the adjusted wait time value.

Referring now to FIG. 6, the operation 530 of method 500 for calculating the maximum job count per queue (Nmax) is illustrated in more detail, according to an embodiment. In operation 605, the number of non-empty queues (Qnonemp) may be determined by the wait time estimator 130 by checking with the queue manager 162. In operation 610, the maximum workload count specified for each non-empty queue (Nq) may be discovered by the wait time estimator 130 by checking the policy engine 168 which obtains information from the resource manager 170 and resource policies 169. In operation 615, the maximum workload count specified for the entire WLM server 150 (Nserver) may be discovered by the wait time estimator 130 by checking the policy engine 168, resource manager 170, and resource policies 169. In operation 620, the average maximum workload count per non-empty queue (Nqavg) may be calculated with the equation: Nqavg=Nserver/Qnonoemp by the wait time estimator 130. In operation 625, a decision may be made by the wait time estimator 130 whether Nq is greater than Nqavg to determine Nmax. If Nq is greater than Nqavg, then, in operation 630, Nqavg equals Nmax. If Nq is less than Nqavg, then, in operation 635, Nq equals Nmax.

Figure 7:
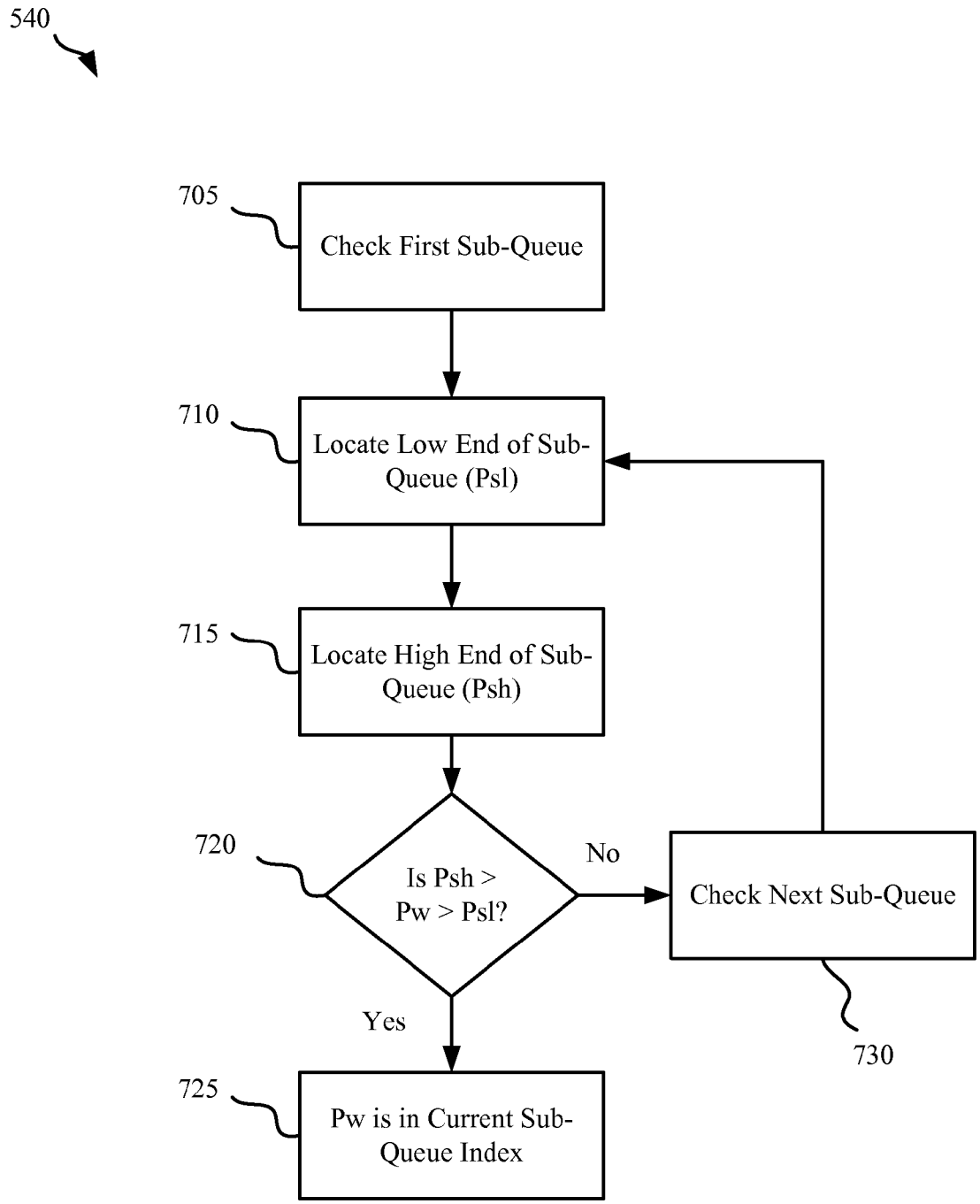
FIG. 7 is one of the operations of the method of FIG. 5 in greater detail, according to an embodiment.

Referring now to FIG. 7, operation 540 of method 500 of FIG. 5 is illustrated in more detail, according to an embodiment. Operation 540 determines where a given workload is located. i.e., which sub-queue includes the workload. In operation 705, the first sub-queue is checked to determine whether the position of the workload (Pw) is in the first sub-queue. In operation 710, the position of the low end (Psl) of the first sub-queue may be located by the equation: Psl=Sindex*Nqavg. The Sindex is the index of a sub-queue (e.g. sub-queue 0, 1, 2, 3 . . . ). In operation 715, the high end position (Psh) of the first sub-queue may be located by the equation: Psh=(Sindex+1)*Nqavg. Now that the range of the positions in the first sub-queue is determined, then, in operation 720, it may be determined whether the position of the workload is between the Psh and the Psl of the first sub-queue. If Pw is within the range, then, in operation 725, it is determined that Pw is in the current sub-queue index. If Pw is greater than Psh, then the next sub-queue index may be checked, in operation 730, which may iterate operations 710-720 until the sub-queue index is located for Pw.

Referring back to FIG. 1, in various embodiments, the WLM server 150 may be a multi-user mainframe computer system, a single-user system, or a server computer or similar device that has little or no direct user interface, but receives requests from other computer systems (clients). In other embodiments, the WLM server 150 may be implemented as a desktop computer, portable computer, laptop or notebook computer, tablet computer, pocket computer, telephone, smart phone, or any other appropriate type of electronic device.

The WLM client 110 may include some or all of the hardware and/or computer program elements of the WLM server 150. The various program components implementing various embodiments may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the WLM server 150 and that, when read and executed by one or more processors in the WLM server 150, or when interpreted by instructions that are executed by one or more processors, cause the WLM server 150 to perform the actions necessary to execute steps or elements including the various embodiments. Embodiments may be embodied as a system, method, or computer program product. Accordingly, embodiments may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for embodiments may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment. But, any particular program nomenclature used herein is used merely for convenience, and thus embodiments are not limited to use solely in any specific application identified and/or implied by such nomenclature. The exemplary environments illustrated in FIG. 1 are not intended to limit the present embodiments. Indeed, other alternative hardware and/or program environments may be used without departing from the scope of embodiments.

The terminology used herein is for the purpose of describing particular embodiments only and is not intended to be limiting of embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments, reference was made to the accompanying drawings (where like numbers represent like elements), which form a part hereof, and in which is shown by way of illustration specific exemplary embodiments in which embodiments may be practiced. These embodiments were described in sufficient detail to enable those skilled in the art to practice the embodiments, but other embodiments may be utilized and logical, mechanical, electrical, and other changes may be made without departing from the scope of the embodiments. In the previous description, numerous specific details were set forth to provide a thorough understanding of embodiments. But, embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. Any equations or formulas provided through out the detailed description are meant as examples only and, therefore, other equations and formulas may be used to accomplish the embodiments disclosed. The previous detailed description is, therefore, not to be taken in a limiting sense.

What is claimed is:

1. A method of asynchronous call-back in a parallel execution system, the method comprising:
   receiving, by a workload management (WLM) server from a WLM client, a first authorization request for authorization to run a workload, the workload in a queue of pending workloads, each pending workload and each of a plurality of prior workloads having an actual wait time spent in the queue of pending workloads, the queue of pending workloads containing a number of workloads (Lq), and wherein a weighted maximum workload count per queue (Nmax) is a maximum number of workloads that can run concurrently in the parallel execution system;
   determining, by the WLM server in response to the receiving the first authorization request, that the workload is not ready to run;
   dividing, by the WLM server, the queue of pending workloads into a number of sub-queues (Ns), wherein Ns=Lq/Nmax;
   calculating, by the WLM server, an average sub-queue wait time (Wsavg) for each of the Ns sub-queues,
   wherein the Wsavg of a given sub-queue is based at least in part on an average queue wait time (Wqavg), the Wqavg of the given sub-queue being an average of the actual wait times of the plurality of prior workloads contained in that given sub-queue;
   calculating, by the WLM server, a first wait time based at least in part on the Wsavg of the sub-queue containing the workload;
   sending, by the WLM server, the first wait time to the WLM client, the first wait time indicating how long the WLM client should wait before sending a second authorization request for the authorization to run the workload;
   sending, by the WLM client, the second authorization request after waiting a time period equal to the first wait time;
   receiving, by the WLM server and after the first wait time has expired, the second authorization request from the WLM client;
   determining, by the WLM server in response to the receiving the second authorization request, that the workload is not ready to run;
   calculating, by the WLM server, a second wait time, the second wait time different from the first wait time; and
   sending, by the WLM server, the second wait time to the WLM client, the second wait time indicating how long the WLM client should wait before sending a third authorization request for the authorization to run the workload.

2. A computer program product for asynchronous call-back in a parallel execution system, the computer program product comprising a non-transitory computer readable storage medium having computer readable program code embodied therewith, wherein the computer readable program code, when executed by a processor of a computer, is configured to perform a method comprising:
   receiving, by a workload management (WLM) server from a WLM client, a first authorization request for authorization to run a workload, the workload in a queue of pending workloads, each pending workload and each of a plurality of prior workloads having an actual wait time spent in the queue of pending workloads, the queue of pending workloads containing a number of workloads (Lq), an wherein a weighted maximum workload count per queue (Nmax) is a maximum number of workloads that can run concurrently in the parallel execution system;
   determining, by the WLM server in response to the receiving the first authorization request, that the workload is not ready to run;
   dividing, by the WLM server, the queue of pending workloads into a number of sub-queues (Ns), wherein Ns=Lq/Nmax;
   calculating, by the WLM server, an average sub-queue wait time (Wsavg) for each of the Ns sub-queues;
   wherein the Wsavg of a given sub-queue is based at least in part on an average queue wait time (Wqavg), the Wqavg of the given sub-queue being an average of the actual wait times of the plurality of prior workloads contained in that given sub-queue;
   calculating, by the WLM server, a first wait time based at least in part on the Wsavg of the sub-queue containing the workload;
   sending, by the WLM server, the first wait time to the WLM client, the first wait time indicating how long the WLM client should wait before sending a second authorization request for the authorization to run the workload;
   sending, by the WLM client, the second authorization request after waiting a time period equal to the first wait time;
   receiving, by the WLM server and after the first wait time has expired, the second authorization request from the WLM client;
   determining, by the WLM server in response to the receiving the second authorization request, that the workload is not ready to run;
   calculating, by the WLM server, a second wait time, the second wait time different from the first wait time; and
   sending, by the WLM server, the second wait time to the WLM client, the second wait time indicating how long the WLM client should wait before sending a third authorization request for the authorization to run the workload.

3. The method of claim 1, further comprising:
   receiving, by the WLM server and before the calculating the first wait time, a first wait time request for the first wait time from the WLM client; and receiving, by the WLM server and before the calculating the second wait time, a second wait time request for the second wait time from the WLM client.

4. The method of claim 1,
wherein a first sub-queue contains the Nmax workloads having actual wait times longer than the actual wait times of all other workloads in the queue of pending workloads, wherein a second sub-queue contains the Nmax workloads having actual wait times shorter than the workloads in the first sub-queue but longer than the actual wait times of all other workloads in the queue of pending workloads, wherein a last sub-queue contains the Nmax or fewer workloads having actual wait times shorter than the actual wait times of all other workloads in the queue of pending workloads,
wherein the first sub-queue has a first $Wsavg=Wqavg/Ns$, wherein the second sub-queue has a second $Wsavg=Wqavg/(Ns-1)$, and wherein the last sub-queue has a last $Wsavg=Wqavg$.

5. The method of claim 4, wherein the calculating the first wait time comprises:
determining that the workload is in the second sub-queue; and
setting the first wait time equal to the second Wsavg.

6. The method of claim 5, wherein the calculating the second wait time comprises:
determining that the workload is in the first sub-queue; and
setting the second wait time equal to the first Wsavg.

7. The method of claim 4, wherein the queue of pending workloads contains a maximum of Lqmax workloads, and wherein the calculating the first wait time comprises:
determining that the workload is in the second sub-queue; and
setting the first wait time equal to the second $Wsavg*Lq/Lqmax$.

8. The computer program product of claim 2, wherein the method further comprises:
receiving, by the WLM server and before the calculating the first wait time, a first wait time request for the first wait time from the WLM client; and
receiving, by the WLM server and before the calculating the second wait time, a second wait time request for the second wait time from the WLM client.

9. The computer program product of claim 2,
wherein a first sub-queue contains the Nmax workloads having actual wait times longer than the actual wait times of all other workloads in the queue of pending workloads, wherein a second sub-queue contains the Nmax workloads having actual wait times shorter than the workloads in the first sub-queue but longer than the actual wait times of all other workloads in the queue of pending workloads, wherein a last sub-queue contains the Nmax or fewer workloads having actual wait times shorter than the actual wait times of all other workloads in the queue of pending workloads,
wherein the first sub-queue has a first $Wsavg=Wqavg/Ns$, wherein the second sub-queue has a second $Wsavg=Wqavg/(Ns-1)$, and wherein the last sub-queue has a last $Wsavg=Wqavg$.

10. The computer program product of claim 9, wherein the calculating the first wait time comprises:
determining that the workload is in the last sub-queue; and
setting the first wait time equal to the last Wsavg.

11. The computer program product of claim 10, wherein the calculating the second wait time comprises:
determining that the workload is in the second sub-queue; and
setting the second wait time equal to the second Wsavg.

12. The computer program product of claim 9, wherein the queue of pending workloads contains a maximum of Lqmax workloads, and wherein the calculating the first wait time comprises:
determining that the workload is in the second sub-queue; and
setting the first wait time equal to the second $Wsavg*Lq/Lqmax$.

* * * * *